United States Patent Office 3,099,627
Patented July 30, 1963

3,099,627
CALCIUM PHOSPHATE FOR PHOSPHORS
Richard W. Mooney and Allan J. Comstock, Towanda, Pa., assignors to Sylvania Electric Products Inc., a corporation of Delaware
No Drawing. Filed July 15, 1959, Ser. No. 827,173
2 Claims. (Cl. 252—301.4)

This invention relates to fluorescent phosphors and methods of preparing them, and to methods of preparing ingredients of the phosphor.

The invention is especially directed to phosphate phosphors, and is particularly effective with halophosphate phosphors, such as, for example, calcium halophosphate activated with antimony, or with antimony and manganese together.

Such phosphors are generally made from ingredients which include calcium hydrogen orthophosphate, which has the chemical formula $CaHPO_4$, and which is often called secondary calcium phosphate, dicalcium phosphate or dibasic calcium phosphate. For convenience, we shall generally refer to it herein as dibasic calcium phosphate.

We have discovered that the brightness and efficiency of the phosphor is greatly dependent on the kind of dibasic calcium phosphate used in its manufacture, and that a gain in efficiency results from using a dicalcium phosphate of uniformly sized crystals having a Fisher Sub Sieve size of about 3 to 10 microns, a bulk density of about 5 to 11 grams per cubic inch, a median optical diameter, as determined by sedimentation analysis, of between about 8 to 12 microns, and a narrow particle size distribution having a "sigma" ($\sigma$) value, as defined in the book "Small Particle Statistics," by G. Herdan (Elsevier Publishing Co., New York, 1953, chapter 6), of about 1.5 to 2.5.

Such a dicalcium phosphate can be produced by adding an aqueous solution of ammonium hydrogen phosphate, $(NH_4)_2HPO_4$, at a concentration between about 0.5 to 1.5 pounds per gallon to an aqueous solution of calcium chloride at a concentration between 2 and 4 pounds per gallon, at a temperature between 80° C. and 100° C.

Other features, advantages and objects of the invention will be apparent from the following specification.

When this dicalcium phosphate is used in the preparation of calcium halophosphate phosphors in a manner familiar to those skilled in the art, it produces a compact phosphor of high visual brightness. Furthermore, since the dibasic calcium phosphate produced by the above method has a higher than normal bulk density, this allows a larger charge to be used in each batch processed thereby making the phosphor preparation process itself more efficient.

When the phosphor so produced is milled in a water or organic lacquer to reduce the particle size of the phosphor to a point where a smooth coating will be obtained on the lamp, the improved performance of this phosphate is apparent. More specifically, the phosphor mills down only 25% of the time of that required for regular phosphor produced from a previous type $CaHPO_4$ having a wide distribution of particle sizes and possessing many particles of colloidal size. This decrease in milling time is believed to be due to the greater crystallinity of the dicalcium phosphate and its phosphor product resulting in easier cleavage of the crystallographic planes in crystals of the phosphor and, therefore, a more rapid reduction in particle size for a given amount of milling.

The lamps produced from phosphors made as described herein average about 1.1 l.p.w. (lumens per watt) more efficient initially and about 1.6 l.p.w. more efficient at the usual rating point of 100 hours' life, than phosphors made from $CaHPO_4$ produced by prior methods, that is, from dibasic calcium phosphate having the usual wide distribution of particle size as produced by prior methods.

As an example, we give the following specific procedure for preparing this improved $CaHPO_4$ and its use in the preparation of an improved calcium halophosphate phosphor:

Diammonium hydrogen phosphate, $(NH_4)_2HPO_4$, at a concentration of 1 lb./gal. is added to calcium chloride at a concentration of 3 lbs./gal. maintaining the temperature of the reaction at 95° C., with an addition rate of approximately 25 gal./min. The addition of $$(NH_4)_2HPO_4$$

is continued until the precipitation is complete as evidenced by a sharp rise in the pH of the mother liquor to about 5, at which time the addition is stopped and the precipitate is allowed to settle. This precipitate is then filtered and washed until the chloride ion is removed. The resulting wet powder is dried at 120° C. overnight, after which it is hammermilled to produce a uniform powder.

The resulting $CaHPO_4$ is then mixed with the following compounds in proportions as given below:

| Material | Gm. mols | Gms. |
|---|---|---|
| $CaHPO_4$ | 3.00 | 4,083.0 |
| $CaCO_3$ | 1.35 | 135.1 |
| $CaF_2$ | 0.40 | 31.2 |
| $NH_4Cl$ | 0.30 | 16.0 |
| $MnCO_3$ | 0.08 | 9.2 |
| $Sb_2O_3$ | 0.06 | 17.5 |
| Total | | 4,292.0 |

The ingredients are intimately blended and air fired in closed crucibles at about 1130° C., or nitrogen fired in open crucibles in a heated silica tube at about 1260° C. The resultant phosphors are given the usual post-firing treatment. The composition cited gives a 4500° K. cool white phosphor, but it is not intended that this example should be used as a limitation, since the raw material in question works equally well in 3500° white phosphor and in other halophosphates. In addition, it is well known in the art that $CaCl_2$ or $SrCl_2$ or other raw materials may be used as a replacement for part or all of the $NH_4Cl$ indicated in the example.

What we claim is:

1. The method of preparing dibasic calcium phosphate which comprises adding an aqueous solution of ammonium hydrogen phosphate at a concentration between about 0.5 to about 1.5 pounds per gallon to an aqueous solution of calcium chloride at a concentration between about 2 and about 4 pounds per gallon until the pH of the resultant liquor rises to a value of about 5, at a temperature between about 80° C. and about 100° C. to precipitate particles of dibasic calcium phosphate of a narrow range of particle sizes having a sigma value between 1.5 and 2.5.

2. The method of making a calcium phosphate phosphor which comprises supplying the phosphate radical by using in the mixture of ingredients used to form the phosphor a dibasic calcium phosphate of about 5 to 11 grams per cubic inch in bulk density and a median optical diameter of eight to twelve microns and a particle size distribution having a sigma value of about 1.5 to 2.5.

References Cited in the file of this patent

UNITED STATES PATENTS 2,535,986    Payne ----------------- Dec. 26, 1950